US010664958B2

(12) United States Patent
Park et al.

(10) Patent No.: US 10,664,958 B2
(45) Date of Patent: May 26, 2020

(54) METHOD OF ADJUSTING BITRATE OF IMAGE AND IMAGE CAPTURING APPARATUS, AND METHOD OF GENERATING BITRATE-ADJUSTED IMAGE

(71) Applicant: HANWHA TECHWIN CO., LTD., Seongnam-si (KR)

(72) Inventors: Young Seo Park, Seongnam-si (KR); Sang Won Lee, Seongnam-si (KR)

(73) Assignee: Hanwha Techwin Co., Ltd., Seoul (KR)

( * ) Notice: Subject to any disclaimer, the term of this patent is extended or adjusted under 35 U.S.C. 154(b) by 35 days.

(21) Appl. No.: 16/009,133

(22) Filed: Jun. 14, 2018

(65) Prior Publication Data

US 2018/0365816 A1 Dec. 20, 2018

(30) Foreign Application Priority Data

Jun. 16, 2017 (KR) .................. 10-2017-0076812

(51) Int. Cl.
| | |
|---|---|
| *G06T 5/00* | (2006.01) |
| *G06T 5/50* | (2006.01) |
| *H04N 5/235* | (2006.01) |
| *H04N 19/124* | (2014.01) |
| *H04N 19/172* | (2014.01) |
| *H04N 19/85* | (2014.01) |
| *H04N 19/146* | (2014.01) |
| *H04N 19/14* | (2014.01) |

(Continued)

(52) U.S. Cl.
CPC ............... *G06T 5/007* (2013.01); *G06T 5/50* (2013.01); *H04N 5/2351* (2013.01); *H04N 5/243* (2013.01); *H04N 19/124* (2014.11); *H04N 19/14* (2014.11); *H04N 19/146* (2014.11); *H04N 19/172* (2014.11); *H04N 19/85* (2014.11); *G06T 2207/30232* (2013.01); *H04N 5/23206* (2013.01)

(58) Field of Classification Search
None
See application file for complete search history.

(56) References Cited

U.S. PATENT DOCUMENTS

| | | | |
|---|---|---|---|
| 8,374,237 B2 | 2/2013 | Demos et al. | |
| 2004/0008772 A1* | 1/2004 | Kojima | H04N 5/232 375/240.08 |

(Continued)

FOREIGN PATENT DOCUMENTS

| | | |
|---|---|---|
| KR | 10-2004-0010601 | 1/2004 |
| KR | 10-2008-0012073 | 2/2008 |

(Continued)

*Primary Examiner* — Quan Pham
(74) *Attorney, Agent, or Firm* — H.C. Park & Associates, PLC (57) ABSTRACT

A method of adjusting an output bitrate of an image by contrast adjustment includes: determining a maximum subtraction rate of a contrast of the image in response to a brightness of the image; comparing a current output bitrate of the image with a target bitrate while reducing the contrast of the image up to the determined maximum subtraction rate of the contrast of the image; and determining the contrast of the image to be the reduced contrast in response to determining that the reduced contrast of the image corresponds to the target bitrate.

18 Claims, 6 Drawing Sheets

(51) Int. Cl.
*H04N 5/243* (2006.01)
*H04N 5/232* (2006.01)

(56) References Cited

U.S. PATENT DOCUMENTS

| | | | | |
|---|---|---|---|---|
| 2007/0076803 | A1* | 4/2007 | Osamoto | H04N 19/139 375/240.29 |
| 2009/0225829 | A2* | 9/2009 | Kwon | H04N 19/172 375/240.03 |
| 2011/0243470 | A1* | 10/2011 | Noguchi | H04N 19/176 382/239 |
| 2015/0373328 | A1* | 12/2015 | Yenneti | H04N 19/14 375/240.03 |
| 2016/0165271 | A1* | 6/2016 | Ardo | G06K 9/4652 725/32 |
| 2017/0208328 | A1* | 7/2017 | Kuusela | H04N 19/146 |

FOREIGN PATENT DOCUMENTS

| | | |
|---|---|---|
| KR | 10-1337410 | 12/2013 |
| KR | 10-2016-0139233 | 12/2016 |
| WO | 02071735 | 9/2002 |

* cited by examiner

METHOD OF ADJUSTING BITRATE OF IMAGE AND IMAGE CAPTURING APPARATUS, AND METHOD OF GENERATING BITRATE-ADJUSTED IMAGE

CROSS REFERENCE TO RELATED APPLICATION

This application claims priority from and the benefit of Korean Patent Application No. 10-2017-0076812, filed on Jun. 16, 2017, which is hereby incorporated by reference for all purposes as if fully set forth herein.

BACKGROUND

Field

Exemplary embodiments/implementations of the invention relate generally to a method of adjusting a bitrate of an image and an image capturing apparatus, and a method of generating a bitrate-adjusted image.

Discussion of the Background

Presently, surveillance cameras are widely used, and technologies for recording, storing, and transmitting images acquired by surveillance cameras are being developed. In particular, as the number of surveillance cameras is increased, the need for efficient use of surveillance cameras and network resources has gradually arisen.

SUMMARY

One or more exemplary embodiments include a method of adjusting a bitrate of an image to reduce a transmission bitrate of an image with reduced deterioration in image quality, and an image capturing apparatus.

According to one or more exemplary embodiments of the invention, a method of adjusting an output bitrate of an image by contrast adjustment includes: determining a maximum subtraction rate of a contrast of the image in response to a brightness of the image; comparing a current output bitrate of the image with a target bitrate while reducing the contrast of the image up to the determined maximum subtraction rate of the contrast of the image; and determining the contrast of the image to be the reduced contrast in response to determining that the reduced contrast of the image corresponds to the target bitrate.

The determining of the maximum subtraction rate may include: calculating an average value of the brightness of the image and a degree of variance of the brightness; and determining a maximum subtraction rate of the contrast of the image in response to the average value of the brightness and the degree of variance of the brightness.

The determining a maximum subtraction rate of the contrast of the image in response to the average value of the brightness and the degree of variance of the brightness may include: reducing the maximum subtraction rate of the contrast of the image as the average value of the brightness increases.

The determining a maximum subtraction rate of the contrast of the image in response to the average value of the brightness and the degree of variance of the brightness may include: reducing the maximum subtraction rate of the contrast of the image as the degree of variance of the brightness increases.

The determining of the maximum subtraction rate of the contrast of the image may include: determining the maximum subtraction rate to be: a first subtraction rate in response to determining that the average value of the brightness is equal to or greater than a predetermined threshold average value and the degree of variance of the brightness is equal to or greater than a predetermined threshold degree of variance; a second subtraction rate in response to determining that the average value of the brightness is equal to or greater than a predetermined threshold average value and the degree of variance of the brightness is less than a predetermined threshold degree of variance; a third subtraction rate in response to determining that the average value of the brightness is less than a predetermined threshold average value and the degree of variance of the brightness is equal to or greater than a predetermined threshold degree of variance; and a fourth subtraction rate in response to determining that the average value of the brightness is less than a predetermined threshold average value and the degree of variance of the brightness is less than a predetermined threshold degree of variance, wherein the fourth subtraction rate may be equal to or greater than the third subtraction rate, wherein the third subtraction rate may be equal to or greater than the second subtraction rate, and wherein the second subtraction rate may be equal to or greater than the first subtraction rate.

The image may include a plurality of frames, and wherein the calculating of the average value of the brightness of the image and the degree of variance of the brightness may include calculating an average value of a brightness of each of at least one of the plurality of frames and a degree of variance of the brightness of each of at least one of the plurality of frames, wherein the determining of the maximum subtraction rate of the contrast of the image in response to the average value of the brightness of each of at least one of the plurality of frames and the degree of variance of the brightness of each of at least one of the plurality of frames may include determining a maximum subtraction rate of a contrast of each of the at least one of the plurality of frames based on an average value of the brightness of each of at least one of the plurality of frames calculated with respect to each of the at least one of the plurality of frames and the degree of variance of the brightness of each of at least one of the plurality of frames, wherein the comparing of the current output bitrate of the image may include comparing a current output bitrate with a target bitrate while reducing the contrast up to the maximum subtraction rate of the contrast determined with respect to each of the at least one of the plurality of frames, the determining of the reduced contrast may include determining the contrast of the image to be the reduced contrast of the image in response to determining that the reduced contrast of the each of the at least one of the plurality of frames corresponds to the target bitrate.

The determining of the contrast may include, in response to determining that the output bitrate and the target bitrate do not correspond to each other while reducing the contrast to correspond to the maximum subtraction rate, determining the contrast reduced by the corresponding maximum subtraction rate as a contrast of the image, wherein the method further may include, after determining of the contrast, comparing a current output bitrate of the image with a target bitrate while increasing a quantization parameter of the image; and determining the quantization parameter of the image to be the increased quantization parameter in response to determining that the increased quantization parameter corresponds to the target bitrate.

The method may further include, after the determining the quantization parameter, applying the determined contrast of the image to the image and encoding the image, to which the contrast is applied, based on the determined quantization parameter of the image.

The comparing of the current output bitrate may include comparing the current output bitrate of the image with a target bitrate while reducing the contrast of the image from a current contrast of the image to a contrast corresponding to the maximum subtraction rate.

The comparing of the current output bitrate may include comparing the current output bitrate of the image with a target bitrate while reducing the contrast of the image from a contrast that is in a predetermined relationship with a contrast corresponding to the maximum subtraction rate, to the contrast corresponding to the maximum subtraction rate.

According to one or more exemplary embodiments of the invention, an image capturing apparatus for adjusting an output bitrate of an image based on contrast adjustment, the image capturing apparatus including a controller, the controller being configured to: determine a maximum subtraction rate of a contrast of the image in response to a brightness of the image; compare a current output bitrate of the image with a target bitrate while reducing the contrast of the image up to the determined maximum subtraction rate of the contrast of the image; and determine the contrast of the image to be the reduced contrast in response to determining that the reduced contrast of the image corresponds to the target bitrate.

The controller may be further configured to: calculate an average value of the brightness of the image and a degree of variance of the brightness; and determine a maximum subtraction rate of the contrast of the image in response to the average value of the brightness and the degree of variance of the brightness.

The controller may further be configured to: reduce a maximum subtraction rate of a contrast of the image as the average value of the brightness increases; and reduce the maximum subtraction rate of the contrast of the image as the degree of variance of the brightness increases.

The maximum subtraction rate may be determined, by the controller, to be: a first subtraction rate in response to determining that the average value of the brightness is equal to or greater than a predetermined threshold average value and the degree of variance of the brightness is equal to or greater than a predetermined threshold degree of variance; a second subtraction rate in response to determining that the average value of the brightness is equal to or greater than a predetermined threshold average value and the degree of variance of the brightness is less than a predetermined threshold degree of variance; a third subtraction rate in response to determining that the average value of the brightness is less than a predetermined threshold average value and the degree of variance of the brightness is equal to or greater than a predetermined threshold degree of variance; and a fourth subtraction rate in response to determining that the average value of the brightness is less than a predetermined threshold average value and the degree of variance of the brightness is less than a predetermined threshold degree of variance, wherein the fourth subtraction rate may be equal to or greater than the third subtraction rate, wherein the third subtraction rate may be equal to or greater than the second subtraction rate, and wherein the second subtraction rate may be equal to or greater than the first subtraction rate.

The image may include a plurality of frames, and wherein the controller may be further configured to calculate an average value of a brightness of each of at least one of the plurality of frames from among the plurality of frames and a degree of variance of the brightness of each of at least one of the plurality of frames; determine a maximum subtraction rate of a contrast of each of the at least one of the plurality of frames based on an average value of the brightness of each of at least one of the plurality of frames calculated with respect to each of the at least one of the plurality of frames and the degree of variance of the brightness of each of at least one of the plurality of frames; compare a current output bitrate with a target bitrate while reducing the contrast at up to the maximum subtraction rate of the contrast determined with respect to each of the at least one of the plurality of frames; and determine the contrast of the image to be the reduced contrast of the image in response to determining that the reduced contrast of the each of the at least one of the plurality of frames corresponds to the target bitrate.

In response to determining that the output bitrate and the target bitrate do not correspond to each other while reducing the contrast to correspond to the maximum subtraction rate, the controller configured to: determine the contrast reduced by the corresponding maximum subtraction rate as a contrast of the image; compare a current output bitrate of the image with a target bitrate while increasing a quantization parameter of the image; and determine the quantization parameter of the image to be the increased quantization parameter in response to determining that the increased quantization parameter corresponds to the target bitrate.

According to one or more exemplary embodiments of the invention, a method of generating an image by adjusting a bitrate of the image based on contrast adjustment, the method may include: determining a maximum subtraction rate of a contrast of the image in response to a brightness of the image; adjusting a contrast of the image such that the contrast of the image corresponds to the maximum subtraction rate of the contrast of the image; and encoding the image according to the adjusted contrast.

The determining of the maximum subtraction rate may include: calculating an average value of the brightness of the image and a degree of variance of the brightness; and determining a maximum subtraction rate of the contrast of the image in response to the average value of the brightness and the degree of variance of the brightness.

The determining a maximum subtraction rate of the contrast of the image in response to the average value of the brightness and the degree of variance of the brightness may include: reducing the maximum subtraction rate of the contrast of the image as the average value of the brightness increases.

The determining a maximum subtraction rate of the contrast of the image in response to the average value of the brightness and the degree of variance of the brightness may include: reducing the maximum subtraction rate of the contrast of the image as the degree of variance of the brightness increases.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
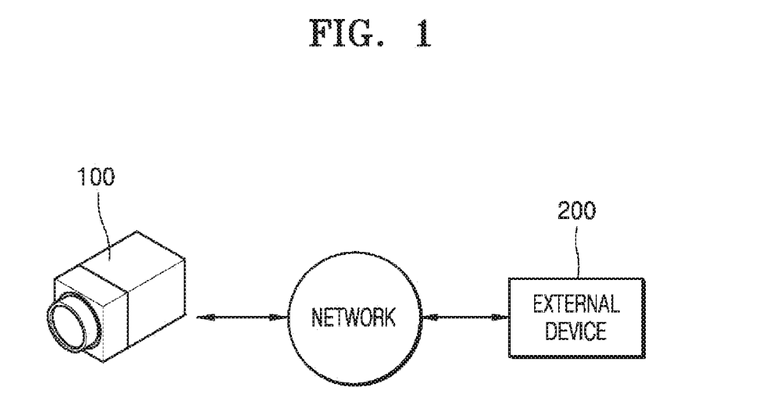
FIG. 1 is a schematic view illustrating an imaging system according to an exemplary embodiment.

FIG. 1 is a schematic view illustrating an imaging system according to an exemplary embodiment of the present disclosure.

Referring to FIG. 1, the imaging system according to an exemplary embodiment may include an image capturing apparatus 100 and an external device 200.

The external device 200 according to an exemplary embodiment may be various devices that receive an image acquired by the image capturing apparatus 100 from the image capturing apparatus 100. For example, the external device 200 may be any one of a video management system (VMS), a central management system (CMS), a network video recorder (NVR), and a digital video recorder (DVR).

The external device 200 may also be a personal computer (PC) or a portable terminal. However, these are examples, and the present disclosure is not limited thereto, and any device that receives an image acquired by the image capturing apparatus 100 through a network and displays and/or stores the image may be used as the external device 200 without limitation.

A network according to an exemplary embodiment connects the image capturing apparatus 100 with the external device 200. For example, the network may provide a path for transmitting an image acquired by the image capturing apparatus 100 to the external device 200. The network may be a wired network such as a local area network (LAN), a wide area network (WAN), a Metropolitan Area Network (MAN), or an Integrated Service Digital Network (ISDN) or a wireless network such as a wireless LAN, Code Division Multiple Access (CDMA), Bluetooth, satellite communication, or the like, but the scope of the present disclosure is not limited thereto.

The image capturing apparatus 100 according to an exemplary embodiment may obtain an image and transmit the image to the external device 200. Here, the image capturing apparatus 100 may adjust a contrast of an image such that a bitrate of the image corresponds to a target bitrate.

Figure 2:
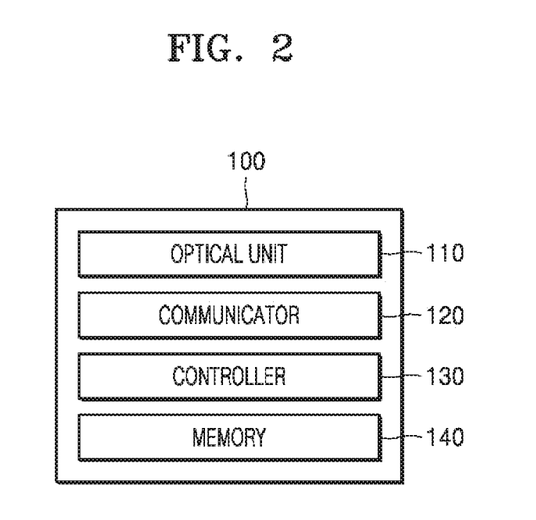
FIG. 2 is a schematic structural diagram of an image capturing apparatus according to an exemplary embodiment.

FIG. 2 is a schematic structural diagram of the image capturing apparatus 100 according to an exemplary embodiment.

Referring to FIG. 2, the image capturing apparatus 100 according to an exemplary embodiment may include an optical unit 110, a communicator 120, a controller 130, and a memory 140.

The optical unit 110 may include a lens and an image sensor to convert light into an electrical signal. The lens may be a lens group including one or more lenses. The image sensor may convert an image input via a lens into an electrical signal. For example, the image sensor may be a semiconductor device such as a charge-coupled device (CCD) or a complementary metal oxide semiconductor (CMOS), which are capable of converting an optical signal into an electrical signal (described as an image in the present disclosure).

The communicator 120 may be an apparatus including hardware and software needed to transmit and receive signals such as a control signal or a data signal through wired or wireless connection to other network devices, but the scope of the present disclosure is not limited thereto.

Here, the controller 130 may adjust a contrast of an image such that a bitrate of the image corresponds to a target bitrate. The controller 130 may include all kinds of devices capable of processing data, such as a processor. Here, a 'processor' may refer to, for example, a data processing device embedded in hardware and having a circuit physically structured to perform a function represented by code or commands included in a program. Examples of the data processing device embedded in hardware as described above may include a microprocessor, a central processing unit (CPU), a processor core, a multiprocessor, an application-specific integrated circuit (ASIC), a field programmable gate array (FPGA) or the like, but the scope of the present disclosure is not limited thereto.

The controller 130 as described above may be a single processor or a plurality of processors divided into units of functions performed by the controller 130. For example, the controller 130 may include one processor and/or one arithmetic unit to calculate an average value of a brightness and a degree of variance of the brightness, determine a maximum subtraction rate of a contrast, and encode an image. Alternatively, the controller 130 may include a calculator calculating an average value of a brightness and a degree of variance of the brightness, a subtraction rate determiner determining a maximum subtraction rate of a contrast, and an encoder encoding an image. However, this is exemplary, and the present disclosure is not limited thereto.

The memory 140 performs a function of temporarily or permanently storing data, instructions, a program, program code, a combination thereof, or the like to be processed by the controller 130. The memory 140 may include magnetic storage media or flash storage media, but the scope of the present disclosure is not limited thereto. The memory 140 may temporarily or permanently store an image obtained by using the image capturing apparatus 100 in addition to data or instructions processed by the controller 130. For example, the memory 140 may include memories of any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Hereinafter, description will focus on a method in which the controller 130 according to an exemplary embodiment adjusts a contrast of an image such that a bitrate of the image corresponds to a target bitrate.

As used herein, an 'image' may refer to at least one frame constituting the image. For example, when a number of frames per second (fps) is thirty, a first frame, a fifteenth frame, and a twenty-third frame may correspond to an image according to the present disclosure. However, this is exemplary, and the present disclosure is not limited thereto.

Hereinafter, for convenience of description, description will focus on operations of the controller 130 in units of frames. However, this is exemplary, and the present disclosure is not limited thereto.

The controller 130 according to an exemplary embodiment may determine a maximum subtraction rate of an image contrast based on a brightness of the image. To this end, the controller 130 according to an exemplary embodiment may calculate an average value of the brightness of the image and a degree of variance of the brightness of the image.

As used herein, 'brightness' may refer to a brightness of a particular frame. In more detail, brightness may refer to a degree of brightness of each pixel included in a particular frame.

As used herein, an 'average value of brightness' may refer to a representative value of a brightness of a particular frame. The average value of the brightness may be calculated according to various methods of calculating a representative value based on a brightness of each pixel. For example, the controller 130 may calculate an average value of a brightness by calculating an arithmetic mean or a geometric mean of brightness. However, this is exemplary, and the present disclosure is not limited thereto.

As used herein, a 'degree of variance of brightness' may refer to a degree of variability of a brightness of a particular frame. The degree of variance of the brightness may also be calculated according to various methods of calculating a degree of variance based on a brightness of each pixel. For example, the controller 130 may calculate a degree of variance of brightness by calculating variance of brightness. However, this is exemplary, and the present disclosure is not limited thereto.

Figure 3A:
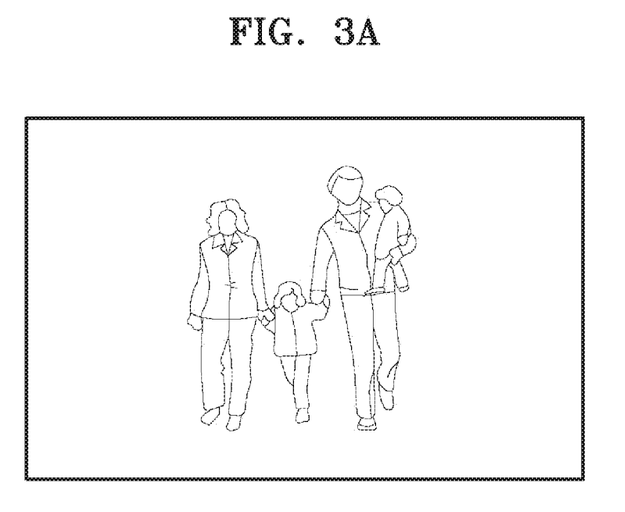
FIGS. 3A and 3B illustrate a method of calculating an average value of a brightness of an image and a degree of variance of the brightness of the image, by a controller according to an exemplary embodiment.
Figure 3B:
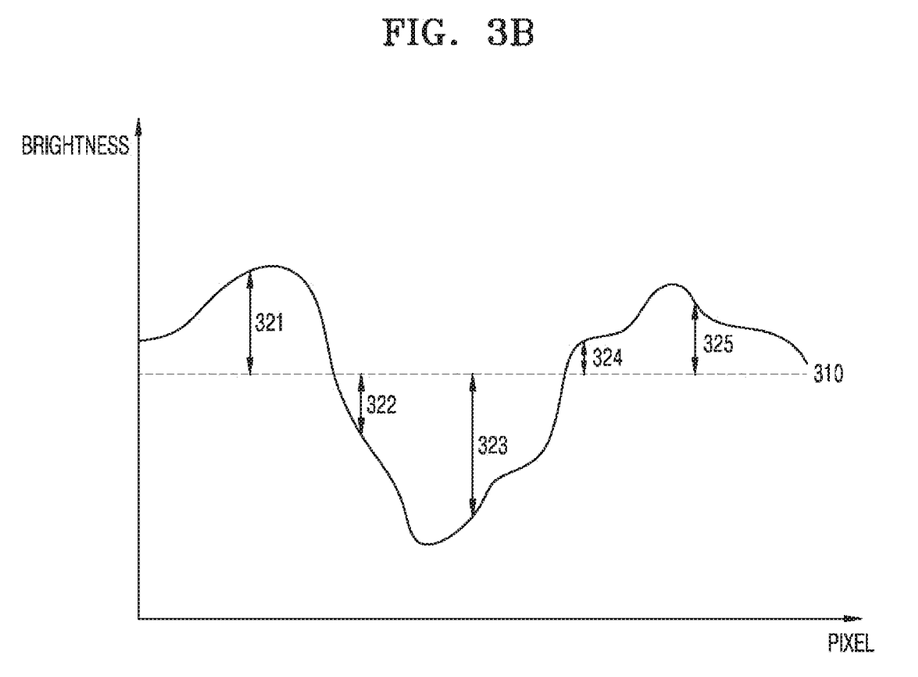

FIGS. 3A and 3B are views for describing a method of calculating an average value of a brightness of an image and a degree of variance of the brightness, by the controller 130 according to an exemplary embodiment. For convenience of description, it is assumed that a brightness of each pixel of an image illustrated in FIG. 3A is as illustrated in FIG. 3B.

The controller 130 may calculate an average value 310 of a brightness based on a brightness of each pixel. In addition, the controller 130 may calculate a degree of variance of a brightness based on a brightness of each pixel and/or the average value 310 of the brightness of each pixel.

The average value 310 of the brightness may increase as a brightness of individual pixels increases, and the average value 310 of the brightness may decrease as the brightness of individual pixels decreases.

In addition, degree of variance of brightness may increase as a difference in brightness of individual pixels increases, and may decrease as a difference in brightness of individual pixels decreases. For example, degree of variance of brightness may increase as differences 321, 322, 323, 324, and 325 in brightness of individual pixels and the average value 310 of the brightness increases.

The controller 130 according to an exemplary embodiment may determine a maximum subtraction rate of a contrast of an image based on the calculated average value of the brightness and the degree of variance of the brightness.

As used herein, a 'maximum subtraction rate of a contrast' may refer to a degree to which a contrast may be reduced to the greatest. Thus, reducing a maximum subtraction rate may refer to reducing a degree to which a contrast may be reduced to the greatest. In this case, a contrast of an image may be adjusted within a relatively narrow adjustment range in which a contrast value is high.

On the other hand, increasing a maximum subtraction rate may refer to increasing a degree to which a contrast may be reduced to the greatest. In this case, a contrast of an image may be adjusted within a relatively broad adjustment range in which there are various contrast values.

A maximum subtraction rate may be set to a rate with respect to a current contrast or as a specific subtraction value according to embodiments. For example, when a maximum subtraction rate is set as a rate, for example, 30%, with respect to a current contrast, and the current contrast is 100, the controller 130 may adjust the contrast within a range of about 70 to about 100. When a specific subtraction value, for example, 20, is set as a maximum subtraction rate and a current contrast is 100, the controller 130 may adjust a contrast within a range of about 80 to about 100.

The controller 130 may determine a maximum subtraction rate of a contrast of an image based on an average value of a brightness and a degree of variance of the brightness as described above. In other words, the controller 130 may determine a maximum subtraction rate of a contrast based on a brightness of a predetermined frame of an image and a degree of variability of the brightness of the frame.

For example, the controller 130 may reduce a maximum subtraction rate of a contrast as an average value of a brightness increases, that is, as a brightness of a predetermined frame increases. Similarly, the controller 130 may reduce a maximum subtraction rate of a contrast of an image as a degree of variance of a brightness increases, that is, as variability of a brightness of a predetermined frame increases.

In addition, the controller 130 may determine a maximum subtraction rate of a contrast based on a predetermined threshold value. For example, the controller 130 may determine a first subtraction rate as a subtraction rate in response to determining that an average value of a brightness is equal to or greater than a predetermined threshold average value and a degree of variance of the brightness is equal to or greater than a predetermined threshold degree of variance. A subtraction rate may be determined as the first subtraction rate as described above when an image is bright and has a relatively large number of edges. The term 'edge' of an image may refer to points at which brightness of the image changes sharply, and according to the exemplary embodiments, number of edges may be detected by degree of variance of the brightness of the image. When an image is bright and has a relatively large number of edges, deterioration of image quality due to reduction of the contrast is relatively greater, and thus, an adjustable range of a contrast may be relatively narrow. In other words, the first subtraction rate may be set to be less than second, third, and fourth subtraction rates to be described later. Meanwhile, the threshold average value and the threshold degree of variance described above may be values that are differently set according to an environment in which the image capturing apparatus 100 according to an exemplary embodiment is installed.

According to the exemplary embodiments, in response to determining that an average value of a brightness is equal to or greater than a predetermined threshold average value and a degree of variance of the brightness is less than a predetermined threshold degree of variance, the controller 130 may determine a second subtraction rate as a subtraction rate. A subtraction rate may be determined as the second subtraction rate as described above when an image is bright and has a relatively small number of edges. When an image is bright and has a relatively small number of edges, deterioration of image quality due to reduction in a contrast is not as great as in the case of a bright image having a relatively large number of edges. However, since the image is bright, an adjustment range for a contrast may be limited. In other words, the second subtraction rate may be greater than the first subtraction rate described above, but less than a third subtraction rate and a fourth subtraction rate which will be described later.

In response to determining that an average value of a brightness is less than a predetermined threshold average value and a degree of variance of the brightness is equal to or greater than a predetermined threshold degree of variance, the controller 130 may determine a third subtraction rate as a subtraction rate. A subtraction rate may be determined as the third subtraction rate as described above when an image is dark and has a relatively large number of edges. When the image is dark and has a relatively large number of edges, deterioration of image quality due to reduction in a contrast may not be as great as when an image is bright. Therefore, the third subtraction rate may be set to be greater than the first subtraction rate and the second subtraction rate, but less than a fourth subtraction rate.

According to the exemplary embodiments, in response to determining that an average value of a brightness is less than a predetermined threshold average value and a degree of variance of the brightness is less than a predetermined threshold degree of variance, the controller 130 may determine a fourth subtraction rate as a subtraction rate. A subtraction rate may be determined as the fourth subtraction rate as described above when an image is dark and has a relatively small number of edges. When an image is dark and has a relatively small number of edges, deterioration of image quality due to reduction in a contrast may not be as great as in all of the above-described cases. Therefore, the fourth subtraction rate may be greater than the first, second, and third subtraction rates.

Figure 4A:
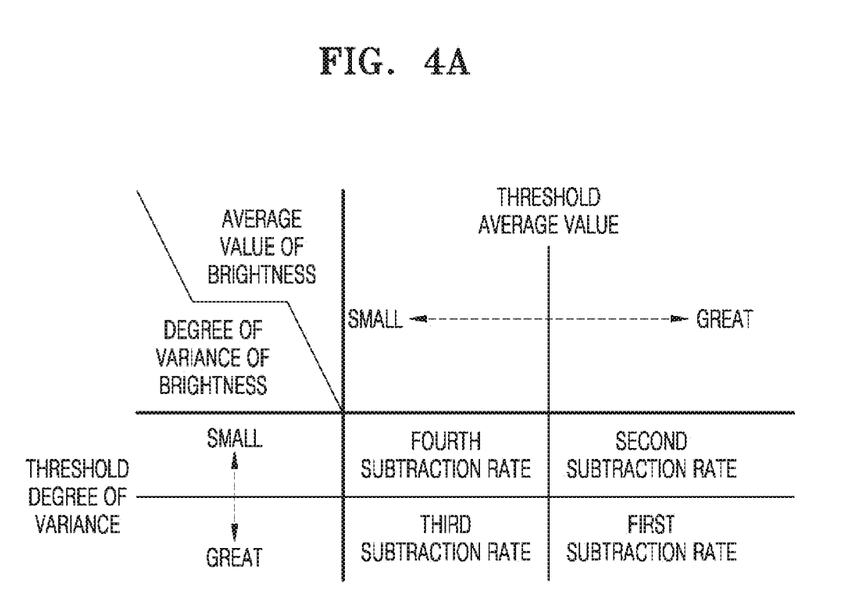
FIG. 4A illustrates a method of determining a subtraction rate according to each case, performed by a controller according to an exemplary embodiment.

FIG. 4A illustrates a method of determining a subtraction rate according to each case, performed by the controller 130 according to an exemplary embodiment.

Referring to FIG. 4A, the controller 130 may determine a first subtraction rate as a subtraction rate in response to determining that an average value of a brightness is equal to or greater than a predetermined threshold average value and a degree of variance of the brightness is equal to or greater than a predetermined threshold degree of variance. A subtraction rate may be determined as the first subtraction rate as described above in response to determining that an image is bright and has a relatively large number of edges. When an image is bright and has a relatively large number of edges, deterioration of image quality due to reduction of a contrast is relatively great, and thus, an adjustable range of a contrast may be relatively narrow.

According to the exemplary embodiments, in response to determining that an average value of a brightness is equal to or greater than a predetermined threshold average value and a degree of variance of the brightness is less than a predetermined threshold degree of variance, the controller 130 may determine a second subtraction rate as a subtraction rate. A subtraction rate may be determined as the second subtraction rate as described above when an image is bright and has a relatively small number of edges. When an image is bright and has a relatively small number of edges, deterioration of image quality due to reduction in a contrast is not as great as in the case of a bright image having a relatively large number of edges. However, since the image is bright, an adjustable range for a contrast may be limited.

The controller 130 may determine a third subtraction rate as a subtraction rate in response to determining that an average value of a brightness is less than a predetermined threshold average value and a degree of variance of the brightness is equal to or greater than a predetermined threshold degree of variance. A subtraction rate may be determined as the third subtraction rate as described above in response to determining that an image is dark and has a relatively large number of edges. When the image is dark and has a large number of edges, deterioration of image quality due to reduction in a contrast may not be as great as when an image is bright.

According to the exemplary embodiments, in response to determining that an average value of a brightness is less than a predetermined threshold average value and a degree of variance of the brightness is less than a predetermined threshold degree of variance, the controller 130 may determine a fourth subtraction rate as a subtraction rate. A subtraction rate may be determined as the fourth subtraction rate as described above in response to determining that an image is dark and has a relatively small number of edges. When an image is dark and has a relatively small number of edges, deterioration of image quality due to reduction in a contrast may not be as great as in all of the above-described cases.

Meanwhile, as described above, the fourth subtraction rate may be equal to or greater than the third subtraction rate, the third subtraction rate may be equal to or greater than the second subtraction rate, and the second subtraction rate may be equal to or greater than the first subtraction rate.

Figure 4B:
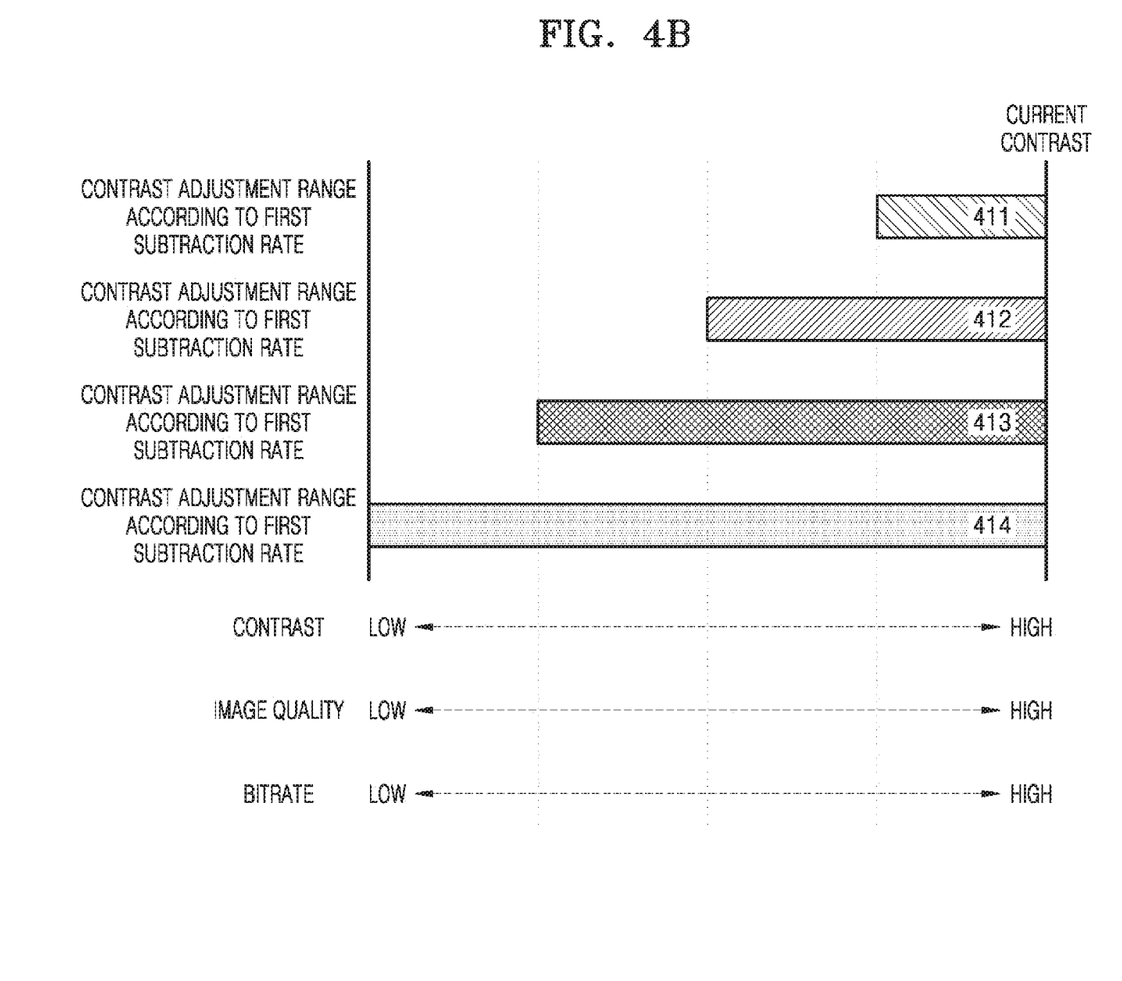
FIG. 4B illustrates a contrast adjustment range according to each subtraction rate according to an exemplary embodiment.

The controller 130 according to an exemplary embodiment may compare a current output bitrate of an image with a target bitrate while reducing a contrast of the image at up to the determined maximum subtraction rate. For example, the controller 130 may compare a current output bitrate of an image with a target bitrate while reducing a contrast of the image from a current contrast of the image to a contrast corresponding to a maximum subtraction rate (FIG. 4B). The controller 130 may also compare a current output bitrate of an image with a target bitrate while reducing a contrast of the image from a contrast that is in a predetermined relationship with a contrast corresponding to a maximum subtraction rate, to a contrast corresponding to the maximum subtraction rate (FIG. 4C).

In other words, the controller 130 according to the exemplary embodiments may reduce a contrast only within a range corresponding to the maximum subtraction rate determined through the above-described process.

Figure 4C:
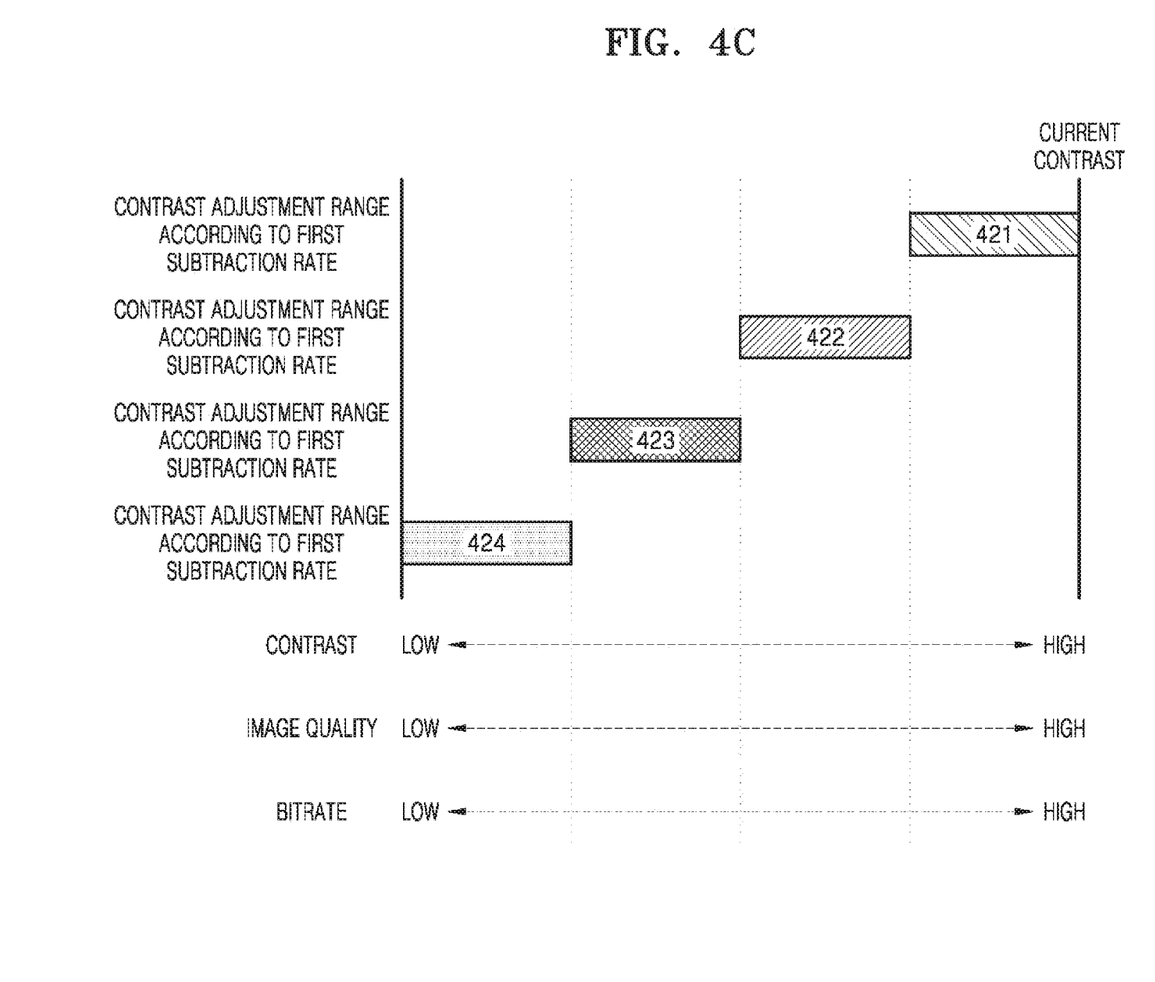
FIG. 4C illustrates a contrast adjustment range according to another exemplary embodiment.

FIGS. 4B and 4C illustrate a contrast adjustment range according to each subtraction rate according to an exemplary embodiment.

First, referring to FIG. 4B, as described above, a contrast adjustment range 411 according to the first subtraction rate may be set relatively narrow, and a contrast adjustment range 412 according to the second subtraction rate, a contrast adjustment range 413 according to the third subtraction rate, and a contrast adjustment range 414 according to the fourth subtraction rate may be set to gradually widen as illustrated in the drawing.

In this case, the controller 130 may compare a current output bitrate of an image with a target bitrate while reducing a contrast of the image from a current contrast of the image to a contrast corresponding to the maximum subtraction rate. For example, when the controller 130 determines a maximum subtraction rate of a contrast of an image to be the third subtraction rate, the controller 130 may adjust the contrast of the image within the contrast adjustment range 413.

FIG. 4C is a view for describing a contrast adjustment range according to another exemplary embodiment. In the example described with reference to FIG. 4B, an adjustment range of the contrast is set from a contrast value according to the maximum subtraction rate to the current contrast value.

However, a contrast adjustment range according to another exemplary embodiment may be set from a contrast value according to a maximum subtraction rate to another value that is a predetermined interval away from the contrast value according to the maximum subtraction rate. For example, as illustrated in FIG. 4C, the contrast adjustment range 421 according to the first subtraction rate may be set from a contrast value according to the first subtraction rate to a current contrast value, and the contrast adjustment range 422 according to the second subtraction rate may be set from a contrast value according to the second subtraction rate to a contrast value according to the first subtraction rate. The contrast adjustment range 413 according to the third subtraction rate may be set from a contrast value according to the third subtraction rate to the contrast value according to the second subtraction rate. The contrast adjustment range 414 according to the fourth subtraction rate may be set from a contrast value according to the fourth subtraction rate to the contrast value according to the third subtraction rate.

In this case, the controller 130 may also compare a current output bitrate of an image with a target bitrate while reducing a contrast of the image from a contrast that is in a predetermined relationship with a contrast corresponding to a maximum subtraction rate to a contrast corresponding to the maximum subtraction rate. For example, when the controller 130 determines the maximum subtraction rate of the image contrast to be the third subtraction rate, the controller 130 may adjust a contrast of the image within the contrast adjustment range 423.

By setting the contrast adjustment ranges as described above, according to another exemplary embodiment, a contrast may be adjusted quickly.

Meanwhile, the controller 130 may determine a contrast at which a current output bitrate corresponds to a target bitrate, to be a contrast of an image. For example, the controller 130 may determine a contrast at which a current output bitrate of an image is identical to a target bitrate, to be a contrast of an image.

As described above, according to the present disclosure, a target bitrate may be satisfied by adjusting a contrast, and thus, phenomena such as block artifacts occurring when reducing a bitrate in a device transmitting an image to a network may be prevented.

When an output bitrate and a target bitrate do not correspond to each other although a contrast has been reduced to correspond to a maximum subtraction rate, the controller 130 according to an exemplary embodiment may determine a contrast that is reduced to correspond to the maximum subtraction rate, as a contrast of an image.

Next, the controller 130 may compare a current output bitrate of an image with a target bitrate while increasing a quantization parameter of the image, and determine a quantization parameter at which the current output bitrate corresponds to the target bitrate to be a quantization parameter of an image.

In other words, when an output bitrate does not meet predetermined conditions even when a contrast has been reduced to the greatest, the controller 130 may additionally adjust a quantization parameter so that the output bitrate satisfies predetermined conditions.

The controller 130 according to an exemplary embodiment may apply the contrast of the image determined through the above-described process to the image and encode the image, to which the contrast is applied, based on the determined quantization parameter.

Thus, according to the present disclosure, an output image having high image quality may be generated while satisfying the target bitrate.

Meanwhile, the above-described process may be performed on each of a plurality of frames included in an image. In other words, the controller 130 may calculate an average value of a brightness and a degree of variance of the brightness of each of at least one of a plurality of frames, and determine a maximum subtraction rate of a contrast of each of at least one of the frames based on the calculated average value of the brightness and the degree of variance of the brightness calculated with respect to each of the at least one of the frames.

In addition, the controller 130 may compare a current output bitrate with a target bitrate while reducing a contrast within the maximum subtraction rate of the contrast determined with respect to each of the at least one of the frames, and determine a contrast at which the current output bitrate corresponds to the target bitrate, to be a contrast of each of the at least one of the frames.

The controller 130 according to another exemplary embodiment may generate an image whose bitrate is adjusted in real time based on contrast adjustment.

In the above-described embodiments, the controller 130 according to an exemplary embodiment generates an image having a bitrate corresponding to the target bitrate. In other words, in the exemplary embodiments described above, the controller 130 adjusts a contrast and/or a quantization parameter of an image to meet the target bitrate.

The controller 130 according to another exemplary embodiment may adjust a contrast of an image to correspond to a maximum subtraction rate of the contrast of the image to generate an output image of an optimal bitrate.

In detail, the controller 130 according to an exemplary embodiment may determine a maximum subtraction rate of a contrast of an image based on a brightness of the image. A method of determining a maximum subtraction rate of the image, performed by the controller 130, is the same as the above-described method, and thus, detailed description thereof will be omitted.

Next, the controller 130 according to an exemplary embodiment may adjust a contrast of an image to correspond to a maximum subtraction rate of the contrast of the image. In other words, the controller 130 according to an exemplary embodiment may reduce the contrast of the image to the greatest.

Finally, the controller 130 according to an exemplary embodiment may encode an image whose contrast is adjusted through the above-described process.

As described above, according to another exemplary embodiment, an output image having high or improved image quality and a reduced bitrate may be generated.

Figure 5:
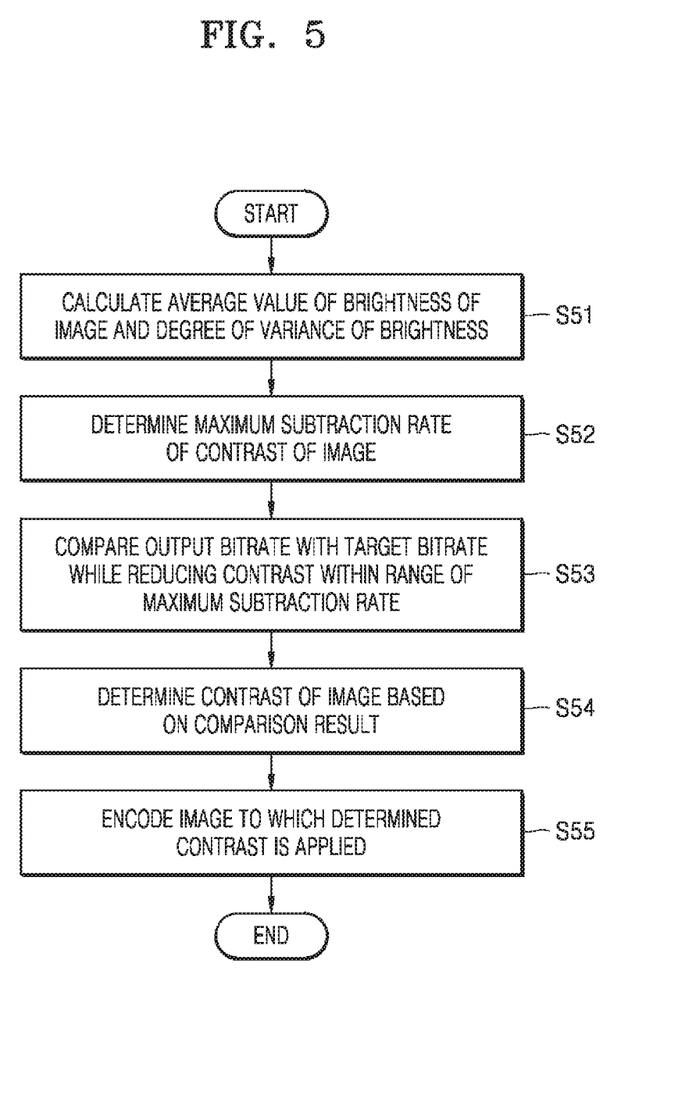
FIG. 5 is a flowchart of a method of adjusting a bitrate, performed by an image capturing apparatus, according to an exemplary embodiment.

FIG. 5 is a flowchart of a method of adjusting a bitrate, performed by an image capturing apparatus 100, according to an exemplary embodiment.

The image capturing apparatus 100 according to an exemplary embodiment may calculate an average value of a brightness of an image and a degree of variance of the brightness of the image (S51).

As used herein, a 'brightness' may refer to a brightness of a particular frame. In more detail, brightness may refer to degree of brightness of each pixel included in a particular frame.

As used herein, an 'average value of brightness' may refer to a representative value of a brightness of a particular frame. The average value of the brightness may be calculated according to various methods of calculating a representative value based on a brightness of each pixel. For example, the image capturing apparatus 100 may calculate an average value of brightness by calculating an arithmetic mean or a geometric mean of brightness. However, this is exemplary, and the present disclosure is not limited thereto.

As used herein, a 'degree of variance of brightness' may refer to a degree of variability of a brightness of a particular frame. The degree of variance of the brightness may also be calculated according to various methods of calculating a degree of variance based on a brightness of each pixel. For example, the image capturing apparatus 100 may calculate a degree of variance of brightness by calculating variance of brightness. However, this is exemplary, and the present disclosure is not limited thereto.

The average value of the brightness may increase as brightness of individual pixels increases, and on the contrary, the average value of the brightness may decrease as the brightness of individual pixels decreases. The degree of variance of brightness may increase the greater a difference in brightness of individual pixels, and may decrease the smaller a difference in brightness of individual pixels.

The image capturing apparatus 100 according to an exemplary embodiment may determine a maximum subtraction rate of a contrast of an image based on the calculated average value of the brightness and the degree of variance of the brightness (S52). In other words, the image capturing apparatus 100 may determine a maximum subtraction rate of a contrast based on a brightness of a particular frame of an image and a degree of variability of the brightness of the frame.

For example, the image capturing apparatus 100 may reduce a maximum subtraction rate of a contrast as an average value of a brightness increases, that is, as a brightness of a particular frame increases. Similarly, the image capturing apparatus 100 may reduce a maximum subtraction rate of a contrast of an image as degree of variance of brightness increases, that is, as variability of a brightness of a particular frame increases.

In addition, the image capturing apparatus 100 may determine a maximum subtraction rate of a contrast based on a predetermined threshold value. For example, the image capturing apparatus 100 may determine a subtraction rate as a first subtraction rate when an average value of a brightness is equal to or greater than a predetermined threshold average value and a degree of variance of the brightness is equal to or greater than a predetermined threshold degree of variance. A subtraction rate may be determined as the first subtraction rate as described above when an image is bright and has a relatively large number of edges. When an image is bright and has a relatively large number of edges, deterioration of image quality due to reduction of the contrast is relatively prominent, and thus, an adjustable range of a contrast may be the narrowest. In other words, the first subtraction rate may be less than second through fourth subtraction rates to be described later. Meanwhile, the threshold average value and the threshold degree of variance described above may be values that are differently set according to an environment in which the image capturing apparatus 100 according to an exemplary embodiment is installed.

Meanwhile, when an average value of a brightness is equal to or greater than a predetermined threshold average value and a degree of variance of the brightness is less than a predetermined threshold degree of variance, the image capturing apparatus 100 may determine a second subtraction rate to be a subtraction rate. A subtraction rate may be determined as the second subtraction rate as described above when an image is bright and has a relatively small number of edges. When an image is bright and has a relatively small number of edges, deterioration of image quality due to reduction in a contrast is not as prominent as in the case of a bright image having a relatively large number of edges. However, since the image is bright, an adjustment range for a contrast may be limited. In other words, the second subtraction rate may be greater than the first subtraction rate described above, but may be less than a third subtraction rate and a fourth subtraction rate which will be described later.

The image capturing apparatus 100 may determine a third subtraction rate to be a subtraction rate when an average value of a brightness is less than a predetermined threshold average value and a degree of variance of the brightness is equal to or greater than a predetermined threshold degree of variance. A subtraction rate may be determined to be the third subtraction rate as described above when an image is dark and has a relatively large number of edges. When the image is dark and has a relatively large number of edges, deterioration of image quality due to reduction in a contrast may not be as prominent as in a bright image. Therefore, the third subtraction rate may be greater than the first subtraction rate and the second subtraction rate.

Finally, when an average value of a brightness is less than a predetermined threshold average value and a degree of variance of the brightness is less than a predetermined threshold degree of variance, the image capturing apparatus 100 may determine a fourth subtraction rate as a subtraction rate. A subtraction rate may be determined to be the fourth subtraction rate as described above when an image is dark and has a relatively small number of edges. When an image is dark and has a relatively small number of edges, deterioration of image quality due to reduction in a contrast may not be as prominent as in all of the above-described cases. Therefore, the fourth subtraction rate may be greater than the first through third subtraction rates.

The image capturing apparatus 100 according to an exemplary embodiment may compare a current output bitrate of an image with a target bitrate while reducing a contrast of the image at up to the determined maximum subtraction rate (S53).

For example, the image capturing apparatus 100 may compare a current output bitrate of an image with a target bitrate while reducing a contrast of the image from a current contrast of the image to a contrast corresponding to a maximum subtraction rate (FIG. 4B). The image capturing apparatus 100 may also compare a current output bitrate of an image with a target bitrate while reducing a contrast of the image from a contrast, which is in a predetermined relationship with a contrast corresponding to the maximum subtraction rate, to the contrast corresponding to the maximum subtraction rate (FIG. 4C).

In other words, the image capturing apparatus 100 according to the exemplary embodiment may reduce a contrast only within a range corresponding to the maximum subtraction rate determined through the above-described process.

Referring back to FIG. 4B, as described above, the contrast adjustment range 411 according to the first subtraction rate may be set relatively narrow, and the contrast adjustment range 412 according to the second subtraction rate, the contrast adjustment range 413 according to the third subtraction rate, and the contrast adjustment range 414 according to the fourth subtraction rate may be set to be gradually widened as illustrated in the drawing.

In this case, the image capturing apparatus 100 may compare a current output bitrate of an image with a target bitrate while reducing a contrast of the image from a current contrast of the image to a contrast corresponding to the maximum subtraction rate. For example, when the image capturing apparatus 100 determines a maximum subtraction rate of a contrast of an image to be the third subtraction rate, the image capturing apparatus 100 may adjust the contrast of the image within the contrast adjustment range 413.

Referring back to FIG. 4C, a contrast adjustment range according to another exemplary embodiment may be set from a contrast value according to a maximum subtraction rate to another value that is a predetermined interval away from the contrast value according to the maximum subtraction rate. For example, as illustrated in FIG. 4C, the contrast adjustment range 421 according to the first subtraction rate may be set from a contrast value according to the first subtraction rate to a current contrast value, and the contrast adjustment range 422 according to the second subtraction rate may be set from a contrast value according to the second subtraction rate to the contrast value according to the first subtraction rate. The contrast adjustment range 413 according to the third subtraction rate and the contrast adjustment range 414 according to the fourth subtraction rate may also be set in the same manner as described above.

In this case, the image capturing apparatus 100 may also compare a current output bitrate of an image with a target bitrate while reducing a contrast of the image from a contrast that is in a predetermined relationship with a contrast corresponding to a maximum subtraction rate to the contrast corresponding to the maximum subtraction rate. For example, when the image capturing apparatus 100 determines the maximum subtraction rate of the image contrast to be the third subtraction rate, the image capturing apparatus 100 may adjust a contrast of the image within the contrast adjustment range 423.

By setting the contrast adjustment ranges as described above, according to another exemplary embodiment, a contrast may be adjusted quickly.

Meanwhile, the image capturing apparatus 100 may determine a contrast at which a current output bitrate corresponds to a target bitrate, to be a contrast of an image. For example, the image capturing apparatus 100 may determine a contrast at which a current output bitrate of an image is identical to a target bitrate, to be a contrast of an image.

As described above, according to the present disclosure, a target bitrate may be satisfied by adjusting a contrast, and thus, phenomena such as block artifacts occurring when reducing a bitrate in a device transmitting an image to a network may be prevented.

When an output bitrate and a target bitrate do not correspond to each other although a contrast has been reduced to correspond to a maximum subtraction rate, the image capturing apparatus 100 according to an exemplary embodiment may determine a contrast that is reduced to correspond to the maximum subtraction rate, to be a contrast of an image.

Next, the image capturing apparatus 100 may compare a current output bitrate of an image with a target bitrate while increasing a quantization parameter of an image, and a quantization parameter at which the current output bitrate corresponds to the target bitrate may be determined to be a quantization parameter of an image.

In other words, when an output bitrate does not meet predetermined conditions even when a contrast has been reduced to the greatest, the image capturing apparatus 100 may additionally adjust a quantization parameter so that the output bitrate satisfies predetermined conditions.

The image capturing apparatus 100 according to an exemplary embodiment may apply the contrast of the image determined through the above-described process to the image and encode the image, to which the contrast is applied, based on the determined quantization parameter (S55).

Thus, according to the present disclosure, an output image having high image quality may be generated while satisfying the target bitrate.

According to an exemplary embodiment, a method of adjusting a bitrate of an image, in which a transmission bitrate of an image may be reduced without deteriorating image quality, and an image capturing apparatus may be implemented.

In addition, by setting a contrast adjustment range according to characteristics of an image, a contrast may be quickly adjusted, and accordingly, a method of quickly adjusting a bitrate of an image and an image capturing apparatus may be implemented.

The exemplary embodiments of the present disclosure described above may be implemented as computer programs executable on a computer via various components, and such computer programs may be recorded to computer-readable media. Examples of the computer-readable recording media include magnetic media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.). Furthermore, the media may include an intangible medium implemented in a form that is transmissible over a network, and may be, for example, a medium in a form that may be implemented in software or an application form and be transmitted and distributed through a network.

The computer programs may be specifically designed and configured for the exemplary embodiments of the present disclosure or may be well-known and available to one of ordinary skill in the art. Examples of the computer programs include not only machine code generated by using a compiler but also high-level language code that can be executed on a computer by using an interpreter or the like.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of adjusting an output bitrate of an image by contrast adjustment, the method comprising:
    determining a maximum subtraction rate of a contrast of the image in response to a brightness of the image;
    comparing a current output bitrate of the image with a target bitrate while reducing the contrast of the image up to the determined maximum subtraction rate of the contrast of the image; and
    determining the contrast of the image to be the reduced contrast in response to determining that the reduced contrast of the image corresponds to the target bitrate.

2. The method of claim 1, wherein the determining of the maximum subtraction rate comprises:
    calculating an average value of the brightness of the image and a degree of variance of the brightness; and
    determining the maximum subtraction rate of the contrast of the image in response to the average value of the brightness and the degree of variance of the brightness.

3. The method of claim 2, wherein the determining of the maximum subtraction rate of the contrast of the image in response to the average value of the brightness and the degree of variance of the brightness comprises:
    reducing the maximum subtraction rate of the contrast of the image as the average value of the brightness increases.

4. The method of claim 2, wherein the determining of the maximum subtraction rate of the contrast of the image in response to the average value of the brightness and the degree of variance of the brightness comprises:
    reducing the maximum subtraction rate of the contrast of the image as the degree of variance of the brightness increases.

5. The method of claim 2, wherein the determining of the maximum subtraction rate of the contrast of the image comprises: determining the maximum subtraction rate to be:
    a first subtraction rate in response to determining that the average value of the brightness is equal to or greater than a predetermined threshold average value and the degree of variance of the brightness is equal to or greater than a predetermined threshold degree of variance;
    a second subtraction rate in response to determining that the average value of the brightness is equal to or greater than a predetermined threshold average value and the degree of variance of the brightness is less than a predetermined threshold degree of variance;
    a third subtraction rate in response to determining that the average value of the brightness is less than a predetermined threshold average value and the degree of variance of the brightness is equal to or greater than a predetermined threshold degree of variance; and
    a fourth subtraction rate in response to determining that the average value of the brightness is less than a predetermined threshold average value and the degree of variance of the brightness is less than a predetermined threshold degree of variance,
    wherein the fourth subtraction rate is equal to or greater than the third subtraction rate,
    wherein the third subtraction rate is equal to or greater than the second subtraction rate, and
    wherein the second subtraction rate is equal to or greater than the first subtraction rate.

6. The method of claim 2, wherein the image comprises a plurality of frames, and
    wherein the calculating of the average value of the brightness of the image and the degree of variance of the brightness comprises calculating an average value of a brightness of each of at least one of the plurality of frames and a degree of variance of the brightness of each of at least one of the plurality of frames,
    wherein the determining of the maximum subtraction rate of the contrast of the image in response to the average value of the brightness of each of at least one of the plurality of frames and the degree of variance of the brightness of each of at least one of the plurality of frames comprises determining a maximum subtraction rate of a contrast of each of the at least one of the plurality of frames based on an average value of the brightness of each of at least one of the plurality of frames calculated with respect to each of the at least one of the plurality of frames and the degree of variance of the brightness of each of at least one of the plurality of frames,
    wherein the comparing of the current output bitrate of the image comprises comparing a current output bitrate with the target bitrate while reducing the contrast up to the maximum subtraction rate of the contrast determined with respect to each of the at least one of the plurality of frames,
    the determining of the reduced contrast comprises determining the contrast of the image to be the reduced contrast of the image in response to determining that the reduced contrast of the each of the at least one of the plurality of frames corresponds to the target bitrate.

7. The method of claim 1, wherein, the determining of the contrast comprises, in response to determining that the output bitrate and the target bitrate do not correspond to each other while reducing the contrast to correspond to the maximum subtraction rate, determining the contrast reduced by the corresponding maximum subtraction rate as a contrast of the image, wherein the method further comprises, after determining of the contrast, comparing a current output bitrate of the image with the target bitrate while increasing a quantization parameter of the image; and determining the quantization parameter of the image to be the increased quantization parameter in response to determining that the increased quantization parameter corresponds to the target bitrate.

8. The method of claim 7, further comprising, after the determining the quantization parameter, applying the determined contrast of the image to the image and encoding the image, to which the contrast is applied, based on the determined quantization parameter of the image.

9. The method of claim 1, wherein the comparing of the current output bitrate comprises comparing the current output bitrate of the image with the target bitrate while reducing the contrast of the image from a current contrast of the image to a contrast corresponding to the maximum subtraction rate.

10. The method of claim 1, wherein the comparing of the current output bitrate comprises comparing the current output bitrate of the image with the target bitrate while reducing the contrast of the image from a contrast that is in a predetermined relationship with a contrast corresponding to the maximum subtraction rate, to the contrast corresponding to the maximum subtraction rate.

11. An image capturing apparatus for adjusting an output bitrate of an image based on contrast adjustment, the image capturing apparatus comprising a controller, the controller being configured to:

determine a maximum subtraction rate of a contrast of the image in response to a brightness of the image;

compare a current output bitrate of the image with a target bitrate while reducing the contrast of the image up to the determined maximum subtraction rate of the contrast of the image; and determine the contrast of the image to be the reduced contrast in response to determining that the reduced contrast of the image corresponds to the target bitrate.

12. The image capturing apparatus of claim 11, wherein the controller is further configured to:

calculate an average value of the brightness of the image and a degree of variance of the brightness; and determine the maximum subtraction rate of the contrast of the image in response to the average value of the brightness and the degree of variance of the brightness.

13. The image capturing apparatus of claim 12, wherein the controller is further configured to:

reduce the maximum subtraction rate of the contrast of the image as the average value of the brightness increases; and reduce the maximum subtraction rate of the contrast of the image as the degree of variance of the brightness increases.

14. The image capturing apparatus of claim 12, wherein the maximum subtraction rate is determined, by the controller, to be:

a first subtraction rate in response to determining that the average value of the brightness is equal to or greater than a predetermined threshold average value and the degree of variance of the brightness is equal to or greater than a predetermined threshold degree of variance;

a second subtraction rate in response to determining that the average value of the brightness is equal to or greater than a predetermined threshold average value and the degree of variance of the brightness is less than a predetermined threshold degree of variance;

a third subtraction rate in response to determining that the average value of the brightness is less than a predetermined threshold average value and the degree of variance of the brightness is equal to or greater than a predetermined threshold degree of variance; and a fourth subtraction rate in response to determining that the average value of the brightness is less than a predetermined threshold average value and the degree of variance of the brightness is less than a predetermined threshold degree of variance, wherein the fourth subtraction rate is equal to or greater than the third subtraction rate, wherein the third subtraction rate is equal to or greater than the second subtraction rate, and wherein the second subtraction rate is equal to or greater than the first subtraction rate.

15. The image capturing apparatus of claim 12, wherein the image comprises a plurality of frames, and wherein the controller is further configured to calculate an average value of a brightness of each of at least one of the plurality of frames from among the plurality of frames and a degree of variance of the brightness of each of at least one of the plurality of frames;

determine a maximum subtraction rate of a contrast of each of the at least one of the plurality of frames based on an average value of the brightness of each of at least one of the plurality of frames calculated with respect to each of the at least one of the plurality of frames and the degree of variance of the brightness of each of at least one of the plurality of frames;

compare a current output bitrate with the target bitrate while reducing the contrast at up to the maximum subtraction rate of the contrast determined with respect to each of the at least one of the plurality of frames; and determine the contrast of the image to be the reduced contrast of the image in response to determining that the reduced contrast of the each of the at least one of the plurality of frames corresponds to the target bitrate.

16. The image capturing apparatus of claim 11, wherein, in response to determining that the output bitrate and the target bitrate do not correspond to each other while reducing the contrast to correspond to the maximum subtraction rate, the controller configured to:

determine the contrast reduced by the corresponding maximum subtraction rate as a contrast of the image;

compare a current output bitrate of the image with the target bitrate while increasing a quantization parameter of the image; and determine the quantization parameter of the image to be the increased quantization parameter in response to determining that the increased quantization parameter corresponds to the target bitrate.

17. A method of generating an image by adjusting a bitrate of the image based on contrast adjustment, the method comprising:

determining a maximum subtraction rate of a contrast of the image in response to a brightness of the image;

reducing a contrast of the image such that the contrast of the image corresponds to the maximum subtraction rate of the contrast of the image; and encoding the image according to the adjusted contrast, wherein the determining of the maximum subtraction rate comprises:

calculating an average value of the brightness of the image and a degree of variance of the brightness; and determining the maximum subtraction rate of the contrast of the image in response to the average value of the brightness and the degree of variance of the brightness, and wherein the determining of the maximum subtraction rate of the contrast of the image in response to the average value of the brightness and the degree of variance of the brightness comprises:

reducing the maximum subtraction rate of the contrast of the image as the average value of the brightness increases.

18. The method of claim 17, wherein the determining of the maximum subtraction rate of the contrast of the image in response to the average value of the brightness and the degree of variance of the brightness comprises:

reducing the maximum subtraction rate of the contrast of the image as the degree of variance of the brightness increases.

* * * * *